United States Patent [19]

Ledger

[11] Patent Number: 5,333,049
[45] Date of Patent: Jul. 26, 1994

[54] APPARATUS AND METHOD FOR INTERFEROMETRICALLY MEASURING THE THICKNESS OF THIN FILMS USING FULL APERTURE IRRADIATION

[75] Inventor: Anthony M. Ledger, New Fairfield, Conn.

[73] Assignee: Hughes Aircraft Company, Los Angeles, Calif.

[21] Appl. No.: 804,872

[22] Filed: Dec. 6, 1991

[51] Int. Cl.⁵ .................................... G01B 9/02
[52] U.S. Cl. ............................. 356/355; 356/359
[58] Field of Search ............... 356/355, 357, 359, 360, 356/345

[56] References Cited

U.S. PATENT DOCUMENTS

| 4,645,349 | 2/1987 | Tabata | 356/355 |
| 4,909,631 | 3/1990 | Tan et al. | 356/357 |
| 5,042,949 | 8/1991 | Greenberg et al. | 356/359 |

FOREIGN PATENT DOCUMENTS

| 0293177 | 11/1988 | European Pat. Off. |
| 2935716 | 3/1980 | Fed. Rep. of Germany |
| WO90/11487 | 10/1990 | PCT Int'l Appl. |

OTHER PUBLICATIONS

Patent Abstracts of Japan, vol. 10, No. 241 (P-488) Aug. 20, 1986.

*Primary Examiner*—Samuel A. Turner
*Attorney, Agent, or Firm*—M. E. Lachman; M. W. Sales; W. K. Denson-Low

[57] ABSTRACT

A measurement instrument which detects the thickness of the outer layer of a wafer 24, includes a filtered white light source forming an aperture image. The white light source includes a halogen lamp 10, a condensing lens 12, a circular aperture 14, a collimator lens 16, a narrow band filter wheel 18, and a second collimator lens 20. A monochromatic beam generated by this filtered white light source illuminates the entire surface of the wafer 24 with collimated light that has passed through a third collimator lens 22. The light reflected off the wafer 24 returns through the third collimator lens 22 and forms an aperture image upon an optical device which redirects this image to a charge coupled device (CCD) camera 30. The image is converted to a map of measured reflectance data by a digitizing circuit 34 and a computer 36. This map of measured reflectance data is then compared to reference reflectance data to generate a map of the outer layer thickness profile of the wafer 24.

42 Claims, 2 Drawing Sheets

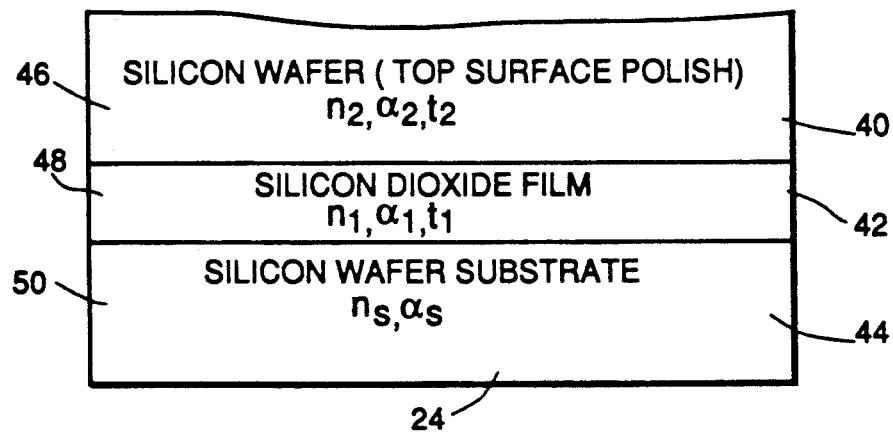
FIG.2.
FIG.3.
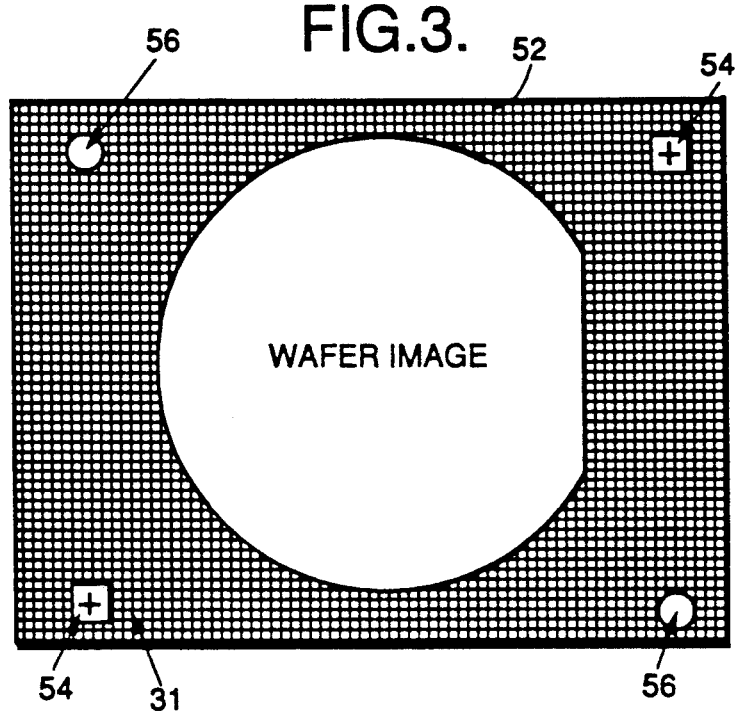
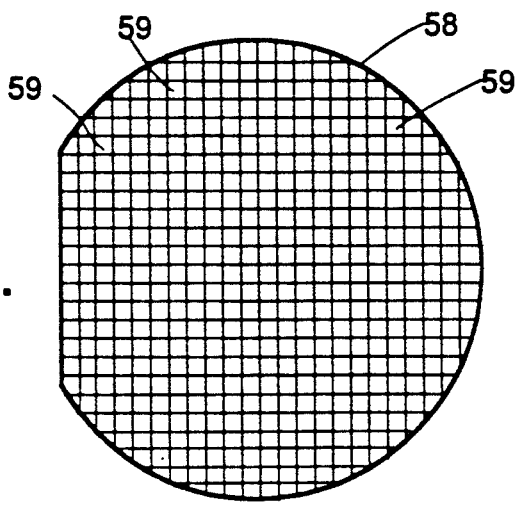
FIG.4.

APPARATUS AND METHOD FOR INTERFEROMETRICALLY MEASURING THE THICKNESS OF THIN FILMS USING FULL APERTURE IRRADIATION

BACKGROUND OF THE INVENTION

1. Field of the Invention

The present invention relates to an apparatus and method for measuring a thin film or layer thickness and, more particularly, to an electro-optical system which measures the thickness of an outer silicon layer of a silicon/silicon dioxide/silicon (Si/SiO$_2$/Si) structured semiconductor wafer.

2. Description of the Prior Art

In one particular application wherein the present invention is especially practical, a silicon-on-insulator (SOI) semiconductor wafer typically includes a Si/SiO$_2$/Si sandwich structure fabricated by growing a silicon dioxide film on one surface of each of two silicon wafers and bonding the two silicon dioxide film surfaces together at high temperature. It will be understood that other materials such as, for example, silicon nitride, may be used for the insulator material and that other materials may be used for the wafer material. In such an application, one of the two outer silicon surfaces of the sandwich structure is mechanically ground and polished to an average thickness of several microns. This mechanical process unfortunately results in large spatial variations in the thickness of this outer silicon layer over the surface of the wafer. To reduce these spatial variations, a thickness error map that indicates thickness non-uniformities of this outer silicon layer over the entire wafer surface, is required, for example, to initialize a further micropolishing process.

A sequence of measuring the spatial variations in the thickness of the outer silicon layer followed by thinning and smoothing this surface by micropolishing may need to be performed several times before the entire outer silicon layer achieves the desired thickness. In order to reduce costs and increase production, a measurement of at least 400 points on a wafer surface in 60 seconds is desirable.

Current commercial instruments, however, typically provide film thickness measurements at only a single point on a surface. These instruments use a focused lens or a fiber bundle to locally illuminate the film surface with a beam of monochromatic light, and a grating or prism spectrograph to measure the surface spectral reflectance at each point. In all cases, this surface spectral reflectance data must be numerically corrected due to variations in the angle of incidence caused by the illuminating beam f-number.

These commercial instruments may be extended to cover an entire wafer surface by moving either the measuring instrument or the wafer in a controlled manner. However, the time required for these instruments to determine the thin film layer thickness at a single point is on the order of several minutes and characterizing an entire film surface of at least 400 measurement points far exceeds the time desired for efficient wafer production.

SUMMARY OF THE INVENTION

The present invention contemplates an electro-optical imaging system for efficiently determining a thin film layer thickness of, for example, a wafer over a full aperture. Non-uniformities in this layer thickness are obtained by measuring the reflectance characteristics for a full aperture of a wafer surface and comparing this measured reflectance data to reference reflectance data by using numerical iteration or by using a calibration wafer having known layer thicknesses.

To efficiently measure the reflectance characteristics of a wafer layer, a filtered white light source is used to produce a sequence of collimated monochromatic light beams at several different wavelengths. These collimated monochromatic beams are individually projected onto the entire surface of the wafer, and coherent interactions occur between this light as it is reflected from the physical boundaries in the wafer structure. As a result of these interactions an interference fringe pattern is formed on the surface of the wafer for each projected beam and, consequently, for each wavelength. A reflected image of each fringe pattern is projected onto a detector array of, for example, a charge coupled device (CCD) camera, where the full aperture of this image is then captured. The fringe pattern image is captured by digitizing pixels in the CCD camera detector array corresponding to the image present. A reflectance map of the entire wafer surface is generated from this captured fringe pattern image. Several reflectance maps are generated from each measured wafer to eliminate thickness ambiguities which may result from outer layers having phase thicknesses greater than $2\pi$.

The reference reflectance data for a wafer may be obtained by a theoretical calculation or through the use of a calibration wafer. The theoretical method consists of numerically computing reference reflectance characteristics based on assumed values of the intrinsic optical properties of the wafer materials. Alternatively, a calibration wafer, having a known thickness profile, may be constructed from the same batch of materials used to construct the wafer to be measured. By subjecting this calibration wafer to the measuring method of the present invention, reference reflectance data is obtained for the known wafer.

The comparison between the measured reflectance data and the reference reflectance data can then be performed by a computer. Upon performing this comparison, the computer can provide a mapping of layer thickness or a mapping of layer thickness non-uniformities over a full aperture of the wafer.

A primary objective of the present invention is to provide an economical means for measuring the outer layer thickness of a wafer surface.

Another objective of the present invention is to provide an efficient means for measuring layer thicknesses.

Another objective of the present invention is to provide a highly accurate means for measuring layer thicknesses.

Another objective of the present invention is to provide a means for measuring wafer layer thicknesses without mechanically scanning the wafer surface.

Another objective of the present invention is to provide a means for measuring layer thicknesses of thin film structures in general, provided that the structure materials are known and a sufficient number of wavelengths are used.

A still further objective of the present invention is to provide an economical means for measuring the outer silicon layer thickness of a SOI semiconductor wafer surface.

Another objective of the present invention is to provide an efficient means for measuring outer silicon layer thicknesses.

Another objective of the present invention is to provide a highly accurate means for measuring outer silicon layer thicknesses.

Another objective of the present invention is to provide a means for measuring SOI semiconductor wafer outer silicon layer thicknesses without mechanically scanning the wafer surface.

DESCRIPTION OF THE DRAWINGS

FIG. 2 is a cross-sectional view of a SOI semiconductor wafer.

FIG. 3 is a plan view of a CCD camera detector array showing a wafer image outline and several reference surface image outlines.

FIG. 4 is a plan view of a calibration wafer having a stepped outer layer surface.

DETAILED DESCRIPTION OF THE PRESENT INVENTION

Figure 1:
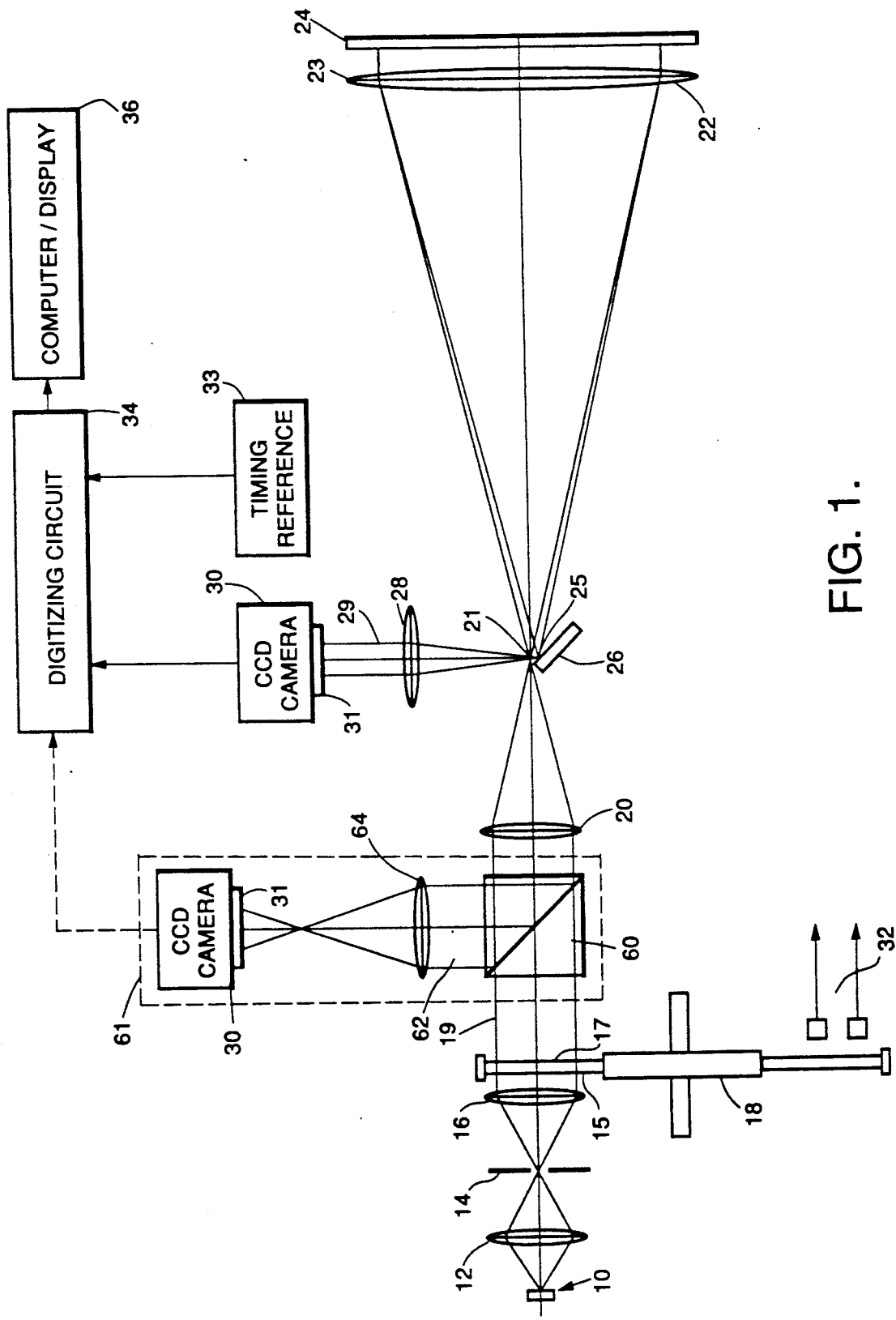
FIG. 1 is a schematic representation of a wafer layer thickness measuring instrument.

An electro-optical system for measuring a layer thickness of a wafer 24 is shown in FIG. 1. For the purposes of this description, the measurement of an outer silicon layer of a SOI semiconductor wafer 24 is described.

The present invention provides a white light source comprised of a circular aperture 14 illuminated by a halogen lamp 10 and a condensing lens 12. Light passing through aperture 14 impinges on a collimator lens 16 to form a beam 15 of collimated light. The size of the aperture 14 determines the field angles in the collimated light sections of the optical system and the orientation is chosen to allow an aperture image to be projected onto the SOI wafer 24. It should be noted that the condensing lens 12 may be replaced by a fiber optic light guide.

The white light source is spectrally filtered by a series of narrow band filters 17, nominally of 30 to 50 Å half bandwidth, placed in the collimated beam 15. The series of filters 17 are placed around the periphery of a rotating filter wheel assembly 18, whereby a corresponding series of collimated monochromatic light beams 19 are produced. The wavelengths of these collimated monochromatic light beams 19 range from 550 nm to 950 nm. Locating the filter wheel assembly 18 in a collimated light section 15 minimizes the spectral broadening of the filtered beam 19 caused by the field angle defined by the size of the aperture 14. A pair of electronic signals 32 are generated by the filter wheel assembly 18 to serve as a timing reference 33 for a digitizing circuit 34. One of these signals indicates the beginning of a filter wheel revolution, whereas the other signal indicates the beginning of each filter period.

A second collimator lens 20 forms a monochromatic image of the aperture 14 about a point 21 in a focal plane of a third collimator lens 22. This third collimator lens 22 produces a collimated beam 23 which illuminates the full aperture of the 100 millimeter diameter SOI wafer 24. Also, an extension of this wafer illumination technique to wafers of 150 millimeters or 200 millimeters in diameter requires that the size of the third collimator lens 22 match the wafer size. It should be noted that a monochromator can replace the halogen lamp 10, the condensing lens 12, the first two collimator lenses 16, 20, and the narrow band filter wheel 18, provided that the slewing rate of the monochromator between different wavelengths is sufficiently high, up to twenty different wavelengths in less than one second.

Referring to FIG. 2, a cross-sectional view of a SOI semiconductor wafer 24 is shown. This wafer 24 is constructed in a sandwich structure consisting of a mechanically polished outer silicon layer 40, an internal silicon dioxide ($SiO_2$)film 42, and a silicon wafer substrate 44. This sandwich structure creates three interfaces 46, 48, 50 from which light, incident upon the outer silicon layer 40, may be reflected. The reflectance characteristics of these interfaces 46, 48, 50 are based upon the intrinsic optical and physical properties of the semiconductor materials in each layer 40, 42, 44 of the SOI wafer 24. These properties consist of the absorption coefficient, $\alpha$, the index of refraction, n, and the thickness, t, of the material layers 40, 42, 44. For an SOI wafer, it is assumed that the absorption coefficient, $\alpha$, of the $SiO_2$ layer 42 is zero. However, in general it is permissible that the absorption coefficient be non-zero, provided that it is known.

When the surface of the SOI wafer 46 is illuminated with collimated monochromatic light from beam 23, a series of coherent interactions occur as this light is reflected between the three material interfaces 46, 48, 50 of the SOI structure 24. These interactions produce a wavelength dependent interference pattern that is visible upon the surface of the wafer. The reflectance at any point on the wafer is determined by the multiple reflections between the three surfaces and by the magnitudes of their physical properties, $n_1, \alpha_1, t_1$, and $n_2, \alpha_2, t_2$ as well as the properties of the substrate $n_s, \alpha_s$. In the unique case of an SOI wafer structure, the substrate indices are identical to those of the outer film indices ($n_s = n_2, \alpha_s = \alpha_2$) since both are fabricated from single crystal silicon. The wafer reflectance at any wavelength can be calculated explicitly as a function of the outer film thickness if all the other parameters are known, however, the reverse problem of computing the thickness from a single measured reflectance is ambiguous. This ambiguity is created by the fact that as the outer film thickness is increased, the measured reflectance cycles between maximum and minimum values as the phase thickness ($n_2 t_2$) increases by $\pi/4$. This multi-valued problem clearly makes the computation of the value of $t_2$ from a single reflectance measurement impossible. The use of multiple wavelength measurements can in principle overcome the multiple value problem but the wavelength dependent behavior of the material properties must be very accurately known otherwise large errors occur in the thickness computations.

An alternate approach is a statistical one where measured reflectance data at several wavelengths is compared on a least squares best fit basis with a library of computed spectral data at the same wavelengths. In the case of an SOI wafer, the library of spectra is computed for all values of the outer film thickness and the selection is made by choosing that outer film thickness which minimizes the least squares fit.

Referring back to FIG. 1, a collimated light image of the interference fringe pattern is reflected off the surface of the SOI wafer 24 and returned through the third collimator lens 22. This third collimator lens 22 projects a condensed image of the reflected fringe pattern upon an off-axis mirror 26. This mirror 26 is positioned at a point 25 in the focal plane of the third collimator lens 22, alongside the position of the aperture image at focal point 21. The separation of these two focal points 21, 25 may be controlled with a slight lateral shift in the optical axis of the third collimator lens 22 with respect to the optical axis of the condensing lens 12 and the first two collimator lenses 16, 20. Equivalently, the wafer 24 may be tilted through a small angle, less than one degree, to achieve this same effect. This image separation scheme avoids the use of a beamsplitter which contains metallic coatings with attendant optical losses.

The off-axis mirror 26 is used to redirect the reflected fringe pattern image from the wafer 24 to a final collimator lens 28. This final collimator lens 28 projects a collimated beam 29 containing an image of the fringe pattern onto a CCD camera detector array 31. It should be noted that the filter wheel assembly 18 may also be placed in this collimated beam 29 provided that the field angle, which is approximately fifteen times larger than the field angle in the collimated beam 23 illuminating the wafer 24, can be tolerated by the narrow band filters.

An alternate method of providing the reflected fringe pattern image to the CCD camera detector array 31 is shown in a dashed line block 61 in FIG. 1. An on-axis beamsplitter 60 is placed in the collimated light beam section 19 where the filter wheel assembly 18 is positioned. The beamsplitter 60 receives a collimated fringe pattern image from the second collimator lens 20 and reflects a portion 62 of this collimated beam to a final collimator lens 64. This final collimator lens 64 converges the fringe pattern image onto the CCD camera detector array 31. Although this alternate method results in optical losses which are inherent in beamsplitters, it does not require an image separation scheme which can introduce field angle errors in the collimated light beam 23 reflected from an off-axis SOI wafer 24. As with the previous method, the filter wheel assembly 18 may be placed in the collimated beam 62 reflected by the beamsplitter 60, provided that the field angle can be tolerated by the narrow band filters 17.

The determination of the method used to provide the reflected fringe pattern image to the CCD camera 30 is critically dependent upon tile optical performance of the third collimator lens 22. When using the off-axis mirror method, the optical design of the third collimator lens 22 must possess an optimal off-axis performance quality and provide a minimal radial color distortion effect. Optimal off-axis performance minimizes the distortion effects associated with field angles that are created when the collimated light beam 23 is reflected from an off-axis non-uniform surface of a SOI wafer 24. Also, the need for a consistent fringe pattern image size at the CCD camera detector array 31 requires radial color distortion correction over the wavelength region of the incident monochromatic light. When the on-axis beamsplitter method is used, however, only the radial color distortion correction requirement applies since the field angles produced in the collimated light beam 23 reflected from an on-axis SOI wafer surface 46 are negligible. Therefore, if the returned fringe pattern image is distorted due sub-optimal off-axis performance by the third collimator lens 22, then the off-axis mirror method is unsuitable and an on-axis beamsplitter 60 must be used.

Referring to FIG. 3, the CCD camera detector array 31 is shown with an image of a scaled SOI wafer outline 52, a pair of reference alignment images 54, and a pair of reference reflecting images 56, projected upon its surface. These reference images are formed by placing reference alignment marks and reference reflecting surfaces along the same plane as the surface of the SOI wafer 24. When illuminated with a collimated light beam 23 from the third collimator lens 22, these references provide reflections from their surfaces. Similar to the SOI wafer fringe pattern, images of these reflected references are returned through the third collimator lens 22 and are eventually projected upon the CCD camera detector array 31. The reference alignment marks provide aid in wafer alignment, whereas the reference reflecting surfaces serve to normalize the CCD signals so that actual wafer reflectances can be calculated.

Referring back to FIG. 1, the collimated beam 29 formed by the final collimator lens 28 contains an image of the reflected fringe pattern. This image is projected upon the CCD camera detector array 31 and captured by the CCD camera 30. A reflectance map is generated by digitizing the CCD pixel signals corresponding to the projected fringe pattern image with a digitizing circuit 34. This raw reflectance data may be normalized to eliminate variations in pixel sensitivity and may be reduced in size by averaging signals over blocks of pixels to match the spatial limitations of the subsequent chemical micropolishing process. In determining the thickness, $t_2$, of the outer silicon layer of the SOI wafer 24, either a numerical computation method or a SOI calibration wafer may be used. Both of these methods require the use of a computer 36.

The numerical method of determining outer silicon layer thickness, $t_2$, consists of assuming values for the thin film constants $n_1$, $\alpha_1$, $t_1$, $n_2$, $\alpha_2$, $n_3$, and $\alpha_3$ and calculating spectral reflectances for a set of wavelengths corresponding to the monochromatic light produced by the filtered white light source. This calculation is done for a number of different outer layer thicknesses, $t_2$, and provided that the initial thin film constant assumptions are correct should only need to be computed once. This calculation provides sets of reflectance values, $R_c(\lambda_1, \lambda_2, \ldots \lambda_n, t_2)$ for thicknesses ranging from the thinnest t the thickest estimated value of the outer silicon layer. These computed spectral reflectances are then compared with the measured reflectance data, $R_m(\lambda_1, \lambda_2, \ldots \lambda_n, t_2)$, at specific points on the wafer using a root mean square (rms) merit function of the form $$M(x, y, t_2) = \left[ \frac{1}{n_{max}} \left[ \sum_{n=1}^{n_{max}} [R_m(\lambda_n, t_2) - R_c(\lambda_n, t_2)]^2 \right] \right]^{\frac{1}{2}}$$

This merit function is evaluated for different values of $t_2$ until a minimum or best match is found, which in turn indicates the most likely thickness. It is, of course, apparent that other pattern matching merit functions can be used, if desired.

Unknown variations in any of the assumed thin film constants may cause errors to propagate through the computation process as outer layer thickness errors. Such first order error sources include the lack of knowledge of the $SiO_2$ inner film thickness, $t_1$, over the wafer aperture and the dispersive effects of the silicon index of refraction, $n_1$. If the value of the merit function is too large, indicating a poor match, then new computed spectral reflectances will have to be generated for a closer set of $t_2$ thicknesses, iterated with the absorption coefficients $\alpha_2$, $\alpha_3$, and the indices of refraction $n_2$, $n_3$, of the outer silicon layer 40 and the silicon substrate 44, respectively, or the index of refraction, $n_1$, and the thickness, $t_1$, of the $SiO_2$ layer 42.

The second method of determining outer silicon layer thickness is to generate a set of spectral reflectances from a SOI calibration wafer 58 containing a stepped outer surface, as shown in FIG. 4, where each square area 59 of the wafer has a different known outer silicon layer thickness. It is preferred that the wafer have at least 500 reference squares to cover the likely range of outer layer thicknesses. This wafer 58 can be calibrated for outer silicon layer thicknesses down to zero silicon thickness by using a stylus profilometer. The calibration wafer 58 is manufactured from the same batch of materials and is subject to the same manufacturing conditions as the wafer 24 under measurement. Consequently, the intrinsic optical properties of the calibration wafer such as the absorption coefficient and the index of refraction, and also the dispersive behavior should match those of the wafer 24 being tested.

The spectral reflectances of the calibration wafer 58 are obtained by subjecting this wafer to the measuring method of the present invention. These spectral reflectances are stored in the computer 36 and are used as a reference for comparison with the spectral reflectances of a measured SOI wafer 24. The calibration wafer 58 has reference reflectances for at least 500 different outer silicon layer thicknesses and the reference reflectance that most closely matches the reflectance at any point on the surface of the measured SOI wafer 24 indicates the outer silicon layer thickness at that point.

Although both of these methods meet the objective of providing a 400 point measurement of outer silicon layer thickness in less than 60 seconds, the calibration wafer method is potentially more accurate than the numerical approach due to the similarity of the intrinsic optical properties between the calibration wafer 58 and the SOI wafer 24 to be measured. However, the calibration wafer method would require on-line production capability to generate a new calibration wafer 58 if the basic wafer process is significantly altered.

What is claimed is:

1. An apparatus for measuring the thickness of a layer of material having front and rear surfaces, said material having the ability to transmit radiation, said apparatus comprising:
   means for irradiating a full aperture area of the layer with radiation so that reflected radiation from said front and rear surfaces has characteristics corresponding to the thickness of the layer in the area;
   means for receiving the reflected radiation and for detecting said characteristics; and
   means for comparing said characteristics of the received radiation with a set of reference characteristics corresponding to known thicknesses to provide an output corresponding to the thickness of the layer in the area.

2. An apparatus as described in claim 1, wherein the means for irradiating comprises a means for irradiating the front surface area of the layer with visible light.

3. An apparatus as described in claim 2, wherein the means for irradiating with visible light comprises means for sequentially irradiating the surface area with monochromatic light of differing wavelengths, so that ambiguities arising when the layer thickness is a multiple of the wavelength are eliminated.

4. An apparatus as described in claim 3, wherein the means for sequentially irradiating with monochromatic light of differing wavelengths comprises:
   a white light source;
   means for directing said white light into a collimated beam;
   a plurality of narrow band filters for passing different wavelengths; and
   means for sequentially placing said narrow band filters one at a time into the collimated beam.

5. An apparatus as described in claim 4, wherein the means for sequentially placing the narrow band filters comprises a rotatable filter wheel assembly.

6. An apparatus as described in claim 5, additionally comprising electronic sensors associated with said filter wheel assembly for providing electrical outputs indicative of the wheel rotation and the beginning of a filter period.

7. An apparatus as described in claim 3, wherein the means for sequentially irradiating with monochromatic light of differing wavelengths comprises a monochromator.

8. An apparatus as described in claim 1, wherein the means for irradiating the full aperture area of the layer with radiation comprises;
   a source of white light;
   means for collimating said light into a collimated beam directed onto said area; and
   means for passing only one selected wavelength of collimated radiation at a time.

9. An apparatus as described in claim 8, wherein means for passing only one selected wavelength comprises a rotatable filter wheel assembly.

10. An apparatus as described in claim 1, wherein means for irradiating comprises a monochromator.

11. An apparatus as described in claim 1, wherein the means for receiving the reflected radiation and detecting said characteristics comprises a charge coupled device.

12. An apparatus as described in claim 1, wherein the set of reference characteristics used in the means for comparing said characteristics is computed based on predetermined thicknesses and assumed optical properties of the material.

13. An apparatus as described in claim 12, wherein the means for comparing includes a computer having the set of reference characteristics stored therein.

14. An apparatus as described in claim 1, wherein the set of reference characteristics used in the means for comparing said characteristics is obtained by storing characteristics derived from a layer of known thickness.

15. An apparatus as described in claim 14, wherein the means for comparing comprises a computer having the set of reference characteristics stored therein.

16. An apparatus as described in claim 1, wherein the layer of material is one of a plurality of thin film layers formed on a substrate.

17. An apparatus as described in claim 16, wherein the substrate also reflects radiation, said radiation is reflected from said front and rear surfaces of the layer and from a front surface of the substrate.

18. An apparatus as described in claim 17, wherein the material of the layer to be measured comprises silicon and the substrate comprises silicon.

19. An apparatus as described in claim 1, wherein the characteristics comprise a fringe pattern.

20. An apparatus as described in claim 1, wherein the front surface of the layer includes a full aperture area and said means for irradiating the front surface area simultaneously irradiates the full aperture area with a single beam of collimated monochromatic radiation, said means for receiving the reflected radiation comprises a charge coupled device camera for simultaneously receiving reflected radiation from the full aperture surface area and said means for comparing provides an output corresponding to a thickness map of the full aperture area.

21. An apparatus as described in claim 20, wherein the layer is formed on a wafer and said means for irradiating includes:
   a source of white light;
   aperture means through-which said light passes;
   means for collimating said light to form a collimated beam;
   narrow band filter means disposed in said collimated beam for producing monochromatic light from said white light; and
   means for expanding the collimated beam to the size of the wafer to form an image of the aperture on said wafer.

22. An apparatus as described in claim 21, wherein the means for receiving the reflected radiation comprises:
   means for focusing the reflected radiation onto a focal plane;
   means for directing said reflected radiation from said focal plane and for generating a collimated beam; and
   a charge coupled device camera positioned at the image of the wafer in the collimated beam for receiving said reflected radiation.

23. An apparatus as described in claim 22, wherein the means for comparing said characteristics comprises:
   digitizing means for digitizing an output signal of said charge coupled device camera; and
   computing means for comparing the digitized signal with a set of digitized signals corresponding to the reference characteristics.

24. An apparatus as described in claim 21, wherein the radiation reflected from said wafer passes in a reverse direction through said means for expanding the collimated beam, said means for receiving comprising:
   a beam splitter disposed within the collimated beam, for redirecting the reflected radiation;
   a charge coupled device camera; and
   focusing means for focusing the re, directed radiation onto the charge coupled device camera.

25. An apparatus as described in claim 24, wherein said means for comparing comprises:
   digitizing means for digitizing an output signal of said charge coupled device camera; and
   computing means for comparing the digitized output signal with a set of digitized signals corresponding to the reference characteristics.

26. An apparatus as described in claim 1, wherein the characteristics corresponding to the thickness of the layer comprise a fringe pattern reflected from the wafer and the means for receiving the reflected radiation comprises a charge coupled device camera for providing an output corresponding to the received fringe pattern.

27. An apparatus as described in claim 26, wherein the charge coupled device camera measures the fringe pattern at a plurality of measuring points to determine the thickness of the layer at said plurality of different locations.

28. An apparatus as described in claim 27, additionally comprising means mounted adjacent to the wafer for reflecting radiation for alignment purposes and for establishing a reflectance standard.

29. An apparatus as described in claim 28, wherein the means for comparing said characteristics of received radiation comprises a reference wafer having different known thicknesses at each of the measuring points, the characteristics of said known thicknesses being measured and storm as the set of reference characteristics.

30. An apparatus as described in claim 28, wherein the set of reference characteristics used in the means for comparing is computed based on predetermined thicknesses and assumed properties of the material.

31. An apparatus for measuring the thickness of a layer of material having front and rear surfaces, said layer being one of a possible plurality of layers each having front and rear surfaces and formed on a front surface of a substrate, said material having properties that will transmit light, said apparatus comprising:
   means for providing a beam of collimated light;
   means for inserting in said beam of collimated light a plurality of narrow band filters, each filter passing a single wavelength so that the beam of collimated light becomes monochromatic;
   means for expanding the beam of collimated light so as to irradiate the entire front surface of said layer, said light being reflected off the front and rear surfaces of the layer and the front and rear surfaces of the possible plurality of other layers and the front surface of the substrate, said reflected light interacting to form a fringe pattern the image of which is reflected;
   means for directing the image of the reflected fringe pattern onto an active surface of a charge coupled device camera, said camera providing an output corresponding to said fringe pattern;
   means for digitizing the output of the charge coupled device camera; and
   means for receiving the digitized output of the charged coupled device camera for comparing said output with a set of stored fringe pattern reference characteristics corresponding to known layer thicknesses and for providing an output corresponding to a thickness map of the layer thickness.

32. An apparatus as described in claim 31, wherein the means for directing the image of the reflected fringe pattern to the charge coupled device camera comprises a mirror and a collimating lens.

33. An apparatus as described in claim 31, wherein the reflected fringe pattern image returns through the means for expanding the collimated beam and said means for directing the fringe pattern image to the charge coupled device camera, comprises a beam splitter disposed within the collimated beam for directing the fringe pattern image to a focusing lens for focusing the image onto the charge coupled display camera.

34. A method for measuring the thickness of a layer of material having front and rear surfaces, said material having the ability to transmit radiation, said method comprising the steps of:
   irradiating a full aperture area of the layer with radiation so that reflected radiation from said front and rear surfaces has characteristics corresponding to the thickness of the layer in the area;
   receiving the reflected radiation;
   detecting said characteristics of said received radiation;
   comparing the detected characteristics of the received radiation with a set of reference characteristics corresponding to known thickness; and providing an output corresponding to the thickness of the layer in the area based on the comparison of the detected characteristics with the set of reference characteristics.

35. A method as described in claim 34, wherein the step of irradiating comprises the step of sequentially irradiating the surface area with monochromatic radiation of differing wavelengths, so that ambiguities, arising when the layer thickness is a multiple of the wavelength, are eliminated.

36. A method as described in claim 35, wherein the step of irradiating includes the steps of:
generating a white light;
forming a collimated beam of said white light; and
filtering the collimated beam to generate monochromatic light of differing narrow band wavelengths.

37. A method as described in claim 34, additionally comprising the step of computing the set of reference characteristics based on predetermined thicknesses and assumed optical properties of the material; and storing said set of reference characteristics.

38. A method as described in claim 34, additionally comprising the steps of:
obtaining a layer of material having areas of known thickness;
measuring said characteristics of the areas of known thickness; and
storing said measured characteristics as the set of reference characteristics.

39. A method as described in claim 34, wherein the step of irradiating includes the step of simultaneously irradiating the entire front surface of said layer with a single beam of collimated monochromatic radiation and the step of providing an output comprises the step of providing an output corresponding to a thickness map of the entire layer.

40. A method as described in claim 34, wherein the step of detecting said characteristic comprises detecting said characteristics using a charge coupled device camera, said camera providing output signals corresponding to said characteristics and said method includes the additional steps of:
digitizing the output signals from said charge coupled device camera; and
comparing the digitized signals with a set of digitized signals, corresponding to the set of reference characteristics.

41. A method as described in claim 40, wherein the characteristic is a fringe pattern developed by the reflected radiation and said charge coupled device camera measures the fringe pattern at a plurality of points to determine the thickness of the layer at said plurality of different points.

42. A method as described in claim 34, additionally comprising the steps of:
performing a chemical micropolishing process upon said front surface of the layer in accordance with the output corresponding to the thickness of the layer; and
repeating the above mentioned steps sequentially until the thickness of the layer corresponds to a predetermined value.

* * * * *